United States Patent
Arnoux et al.

(10) Patent No.: US 9,348,886 B2
(45) Date of Patent: May 24, 2016

(54) FORMATION AND DESCRIPTION OF USER SUBGROUPS

(71) Applicant: Facebook, Inc., Menlo Park, CA (US)

(72) Inventors: Boris Arnoux, San Mateo, CA (US); Spencer Powell, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 110 days.

(21) Appl. No.: 13/720,763

(22) Filed: Dec. 19, 2012

(65) Prior Publication Data

US 2014/0172855 A1 Jun. 19, 2014

(51) Int. Cl.
*G06F 17/30* (2006.01)
*G06Q 50/00* (2012.01)
*G06Q 10/10* (2012.01)
*G06Q 30/02* (2012.01)

(52) U.S. Cl.
CPC .......... *G06F 17/30598* (2013.01); *G06Q 10/10* (2013.01); *G06Q 30/02* (2013.01); *G06Q 50/01* (2013.01)

(58) Field of Classification Search
CPC .................... G06F 17/30705; G06F 17/30598; G06F 17/3071
USPC .......................................................... 707/738
See application file for complete search history.

(56) References Cited

U.S. PATENT DOCUMENTS

| | | | |
|---|---|---|---|
| 6,405,159 B2 | 6/2002 | Bushey et al. | |
| 7,860,830 B2 * | 12/2010 | Mirrashidi et al. | 707/626 |
| 8,219,583 B2 * | 7/2012 | Moitra et al. | 707/776 |
| 8,484,083 B2 * | 7/2013 | Basu et al. | 705/14.66 |
| 2009/0037355 A1 * | 2/2009 | Brave | G06F 17/30867 706/45 |
| 2009/0164442 A1 * | 6/2009 | Shani et al. | 707/5 |
| 2009/0248607 A1 * | 10/2009 | Eggink et al. | 706/54 |
| 2010/0005105 A1 | 1/2010 | Zhang et al. | |
| 2010/0121850 A1 * | 5/2010 | Moitra | G06Q 30/02 707/737 |

(Continued)

FOREIGN PATENT DOCUMENTS

| JP | 2011-118642 A | 6/2011 |
|---|---|---|
| WO | WO 2012/055067 A1 | 5/2012 |

OTHER PUBLICATIONS

European Extended Search Report, European Application No. 13197667.2, Mar. 27, 2014, 7 pages.

(Continued)

*Primary Examiner* — Rehana Perveen
*Assistant Examiner* — Hicham Skhoun
(74) *Attorney, Agent, or Firm* — Fenwick & West LLP

(57) ABSTRACT

A system forms sub-groups from a given user group of a social networking system and form descriptions of the sub-groups that provide an intuitive understanding of sub-group composition, such as likings of the sub-groups. In one embodiment, a given user group of a social networking system is clustered into a plurality of sub-groups, and representative characteristics—such as the characteristics of a composite or actual member of the sub-group—are determined for each sub-group. In order to form sub-group descriptions, a set of objects, such as pages of the social networking system, is ranked with respect to the representative characteristics of the sub-group. The highest-ranking objects for a sub-group are then used to form the description of that sub-group. For example, the topics associated with each of the highest-ranking pages can be combined into the sub-group description.

16 Claims, 4 Drawing Sheets

(56) References Cited

U.S. PATENT DOCUMENTS

| | | |
|---|---|---|
| 2010/0205057 A1 | 8/2010 | Hook et al. |
| 2011/0106796 A1* | 5/2011 | Svaic ............................ 707/728 |
| 2011/0252044 A1 | 10/2011 | Shin |
| 2011/0288935 A1 | 11/2011 | Elvekrog et al. |
| 2012/0016875 A1* | 1/2012 | Jin et al. ........................ 707/734 |
| 2012/0271831 A1 | 10/2012 | Narayanan et al. |
| 2013/0054708 A1* | 2/2013 | Bhatt et al. .................... 709/206 |
| 2013/0073390 A1* | 3/2013 | Konig et al. ............... 705/14.54 |

OTHER PUBLICATIONS

PCT International Search Report and Written Opinion, PCT Application No. PCT/US2013/075809, Apr. 8, 2014, 12 pages.

\* cited by examiner

User u

FORMATION AND DESCRIPTION OF USER SUBGROUPS

BACKGROUND

The present invention generally relates to the field of computer data storage and retrieval, and more specifically, to identifying and describing user sub-groups.

Organizations often wish to understand in more detail the composition of a set of people of interest. For example, advertisers may wish to better understand the nature of a group of people to whom they might advertise, including the identities of various sub-groups within the larger group and characteristics of those sub-groups, since this would aid in the creation of subgroup-specific advertisements. Unfortunately, in many cases it is difficult to identify useful sub-groups. Further, even in cases where useful sub-groups can be identified, there is no standardized way to describe the sub-groups in a way that meaningfully conveys information about the composition and interests of the sub-groups.

SUMMARY

Embodiments of the invention form sub-groups from a given user group of a social networking system and form descriptions of the sub-groups. The descriptions provide an intuitive understanding of sub-group composition, such as likings of the sub-groups, and are expressed in terms of the preferences or likings of the sub-groups.

In one embodiment, a given user group of a social networking system is clustered into a plurality of sub-groups, and representative characteristics—such as the characteristics of a composite or actual member of the sub-group—are determined for each sub-group. To form sub-group descriptions, a set of objects, such as pages of the social networking system, is ranked with respect to the representative characteristics of the sub-group. The highest-ranking objects for a sub-group are then used to form the description of that sub-group. For example, the topics associated with each of the highest-ranking pages can be combined into the sub-group description.

Clustering algorithms typically represent each object to be clustered (e.g., a user) by representing the object as a feature vector that characterizes the object and comparing the feature vectors of different objects. Specifically, a distance function is applied to the feature vectors of pairs of the objects, with objects for which the distance function produces a low value (i.e., "nearby" objects) being clustered into the same group. In one embodiment, one set of feature vectors associated with the users is converted to another set of feature vectors with a lesser degree of sparsity, thus improving the ability of the clustering algorithm to meaningfully cluster the users. For example, in one embodiment a set of object affinities of the user is used to infer a smaller set of interests of the user. The user interests then serve as a feature vector to which a distance function is applied to cluster the users into sub-groups.

In one embodiment, to rank objects with respect to a sub-group, a representative user is identified for the sub-group. In one embodiment, the representative user is a synthetic composite of attributes of the users in the sub-group. In one such embodiment, the attributes of each user in the sub-group are weighted according to a distance of the corresponding user from a centroid of the sub-group, and the weighted attributes are averaged across all the users in the sub-group to obtain a centroid of the sub-group.

In one embodiment, the objects (e.g., pages of the social networking system) are ranked with respect to a sub-group by applying conditional probabilities to determine the probability that the representative user (e.g., a theoretical composite user) will have an affinity for the objects. In one such embodiment, conditional probabilities are computed in terms of an intermediate variable, such as a user interest. For example, the system may compute, for each possible interest, the conditional probability that a user with given attributes will have that interest, and also computes the conditional probability that a user having that interest will have an affinity for a particular object. These conditional probabilities are then applied to determine the probability that a given user will have an affinity for a particular object.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

System Architecture

Figure 1:
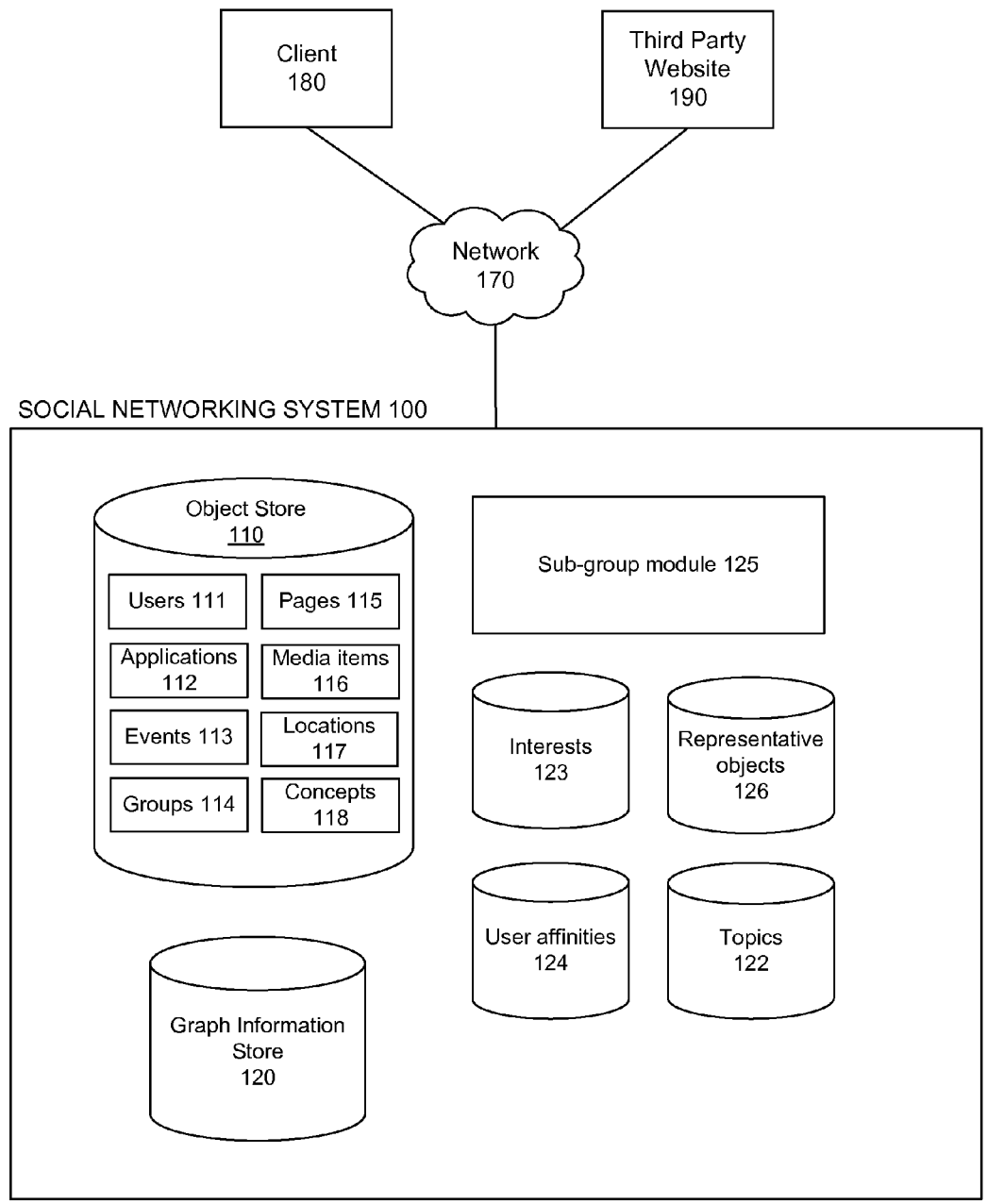
FIG. 1 is a high-level block diagram of a computing environment, according to one embodiment.

FIG. 1 is a high-level block diagram of a computing environment according to one embodiment. FIG. 1 illustrates a social networking system 100, a client device 180, and a third party website 190 connected by a network 170. A user of the client device 180 interacts with the social networking system 100 via an application such as a web browser, performing operations such as browsing content, posting messages, performing queries for people or other content of interest, and the like. The user can also use the client device 180 to interact with the third party website 190. Additionally, the third party website 190 can also interact with the social networking system 100 to obtain or to display data of the social networking system, either directly or indirectly.

The social networking system 100 comprises an object store 110 that stores information on various objects tracked by the social networking system 100. These objects may represent a variety of things with which a user may interact in the social networking system 100, including, without limitation, other users 111 of the social networking system (represented, e.g., as a profile object for the user), applications 112 (e.g., a game playable within the social networking system), events 113 (e.g., a concert that users may attend), groups 114 to which users may belong (e.g., a group devoted to alternative energy research), pages 115 (e.g., pages constituting a particular person or organization's presence on the system, such as pages about particular politicians, car models, or TV shows), items of media 116 (e.g., pictures, videos, audio, text, or any other type of media content), locations 117 associated with a user (e.g., "San Jose, Calif., USA"), and concepts 118 or other terms (e.g., an object corresponding to the concept "alternative energy"). The objects may have additional metadata associated with them. For example, in one embodiment some or all of the pages 115 have an associated topic (e.g., one of the concepts 118, such as a particular car model, television show, sport, or the like). The object store 110 may further store objects representing other data routinely produced by users of the social networking system 100, such as inbox messages, status updates, comments, notes, and postings. An object in the object store 110 may represent an entity existing within the social networking system (e.g., an application 112 available on the social networking system), a virtual entity that exists outside the domain of the social networking system (e.g., a website), or a real-world entity (e.g., a person, a product, or a show).

The object store 110 may store all of the objects existing within the social networking system 100, such as the code of an application 112, or the image data associated with an image media item 116. Alternatively, for virtual entities existing outside of the social networking system 100, the object store 110 may contain some form of pointer or reference to the entities, such as the uniform resource locator (URL) of an external media item 116. Additionally, the object store 110 may also store metadata associated with the objects, such as a name describing the object (e.g. "Al Gore" for a person or page 115, or "Green Energy Group" for a group 114), an image representing the object (e.g., a user profile picture), or one or more tags assigned to the object by users (e.g. the textual strings "game", "crime", and "strategy" for a strategy game application). Different types of objects may have different types of metadata, such as a set of associated users 111 for a group 114, a media type (e.g., "video") for a media item object 116, and a unique user ID and name tokens (e.g., separate first and last names "Al" and "Gore") for a user object 111.

In one embodiment the social networking system 100 further comprises a graph information store 120 that represents the objects of the object store 110 as nodes that are linked together in a "social graph." The graph information store 120 thus comprises information about the relationships between or among the objects, represented as the edges connecting the various object nodes. Various examples of edges in the social graph include: an edge between two user objects 111 representing that the users have a relationship in the social networking system (e.g., are friends, or have communicated, viewed the other's profile, or interacted in some way), an edge between a user object 111 and an application object 112 representing that the user has used the application, and an edge between a user object 111 and a group object 114 representing that the user belongs to the group, and an edge between a user object 111 and a page object 115 representing that the user has viewed the page or expressly specified an affinity for the page (e.g., "Liked" the page).

For example, if one user 111 establishes a relationship with another user in the social networking system, the two users are each represented as a node, and the edge between them represents the established relationship; the two users are then said to be connected in the social network system. Continuing this example, one of these users may send a message to the other user within the social networking system. This act of sending the message is another edge between those two nodes, which can be stored and/or tracked by the social networking system. The message itself may be treated as a node. In another example, one user may tag another user in an image that is maintained by the social networking system. This tagging action may create edges between the users as well as an edge between each of the users and the image, which is also a node. In yet another example, if a user confirms attending an event, the user and the event are nodes, where the indication of whether or not the user will attend the event is the edge.

Using a social graph, therefore, a social networking system may keep track of many different types of objects and edges (the interactions and connections among those objects), thereby maintaining an extremely rich store of socially relevant information.

In one embodiment, edges in the graph information store 120 have associated metadata, such as a label describing the type of relationship (e.g., "friend" as the label between two user objects), and/or a value quantifying the strength of the relationship. Further, a relationship degree, or "distance," between any two objects can be ascertained by determining the number of edges on the shortest path between the objects. For example, two user objects that have an edge between them (e.g., denoting a friendship relationship) have a relationship degree (or "distance") of one and are considered first-order connections. Similarly, if a user object A is a first-order connection of user object B but not of user object C, and B is a first-order connection of C, then objects A and C have a relationship degree of two, indicating that C is a second-order connection of A (and vice-versa).

The social networking system 100 further comprises a set of topics 122 determined to be representative of objects (e.g., pages 115) as a whole, and a smaller set of interests 123 representing various interests that a user 111 could have. For example, the topics 122 might comprise a number of topics related to automobiles, such as automobile brands such as FORD or TOYOTA, or particular automobile models such as FORD MUSTANG, TOYOTA PRIUS, OR TOYOTA CAMRY, whereas the interests 123 might include only the single interest "automobile." In one embodiment, for example, the topics 122 comprise 6,000 discrete topics whereas the interests 123 comprise only 600 discrete interests. Both the topics 122 and the interests 123 may consist partially or entirely of ones of the concepts 118.

The topics 122 and interests 123 may be determined in a number of manners in different embodiments. For example, they may be explicitly specified by employees of the social networking system 100 based on observation and experience. Alternatively, they may be automatically identified, either at a single initial time, or on a recurring basis. For example, the topics 122 may be automatically identified by identifying a topic for each page 115 accessed by users 111, identifying the 6,000 most frequent topics of the aggregate page accesses, and selecting the most frequently accessed page for each of those topics.

In one embodiment, the social networking system 100 further comprises a set of representative objects 126, each representative object corresponding to one of the topics 122. In one embodiment, the objects are pages 115. For example, for a page topic 122 "TOYOTA PRIUS," the corresponding representative page object 126 could be the official page of TOYOTA devoted to the PRIUS.

In one embodiment, the social networking system 100 further comprises a vector of user affinities 124 for each user 111. The user affinities vector 124 represents expressly-specified affinities of the users for particular objects, such as ones of the representative pages 126. One example of an expressly-specified user affinity is a "Like" for a page. For instance, a given user might have expressed an affinity for a representative page 126 devoted to a particular model of car, for a representative page devoted to a particular television show, and for several representative pages devoted to various sports teams in which the user is interested. A typical user would not have expressed an affinity for the vast majority of the representative pages 126, and hence the set of user page affinities for that user would be highly sparse.

For purposes of example, the below often refers to a user affinities vector 124 for pages 111, specifically, and refers to the representative objects 126 as representative pages. It is appreciated however, that in other embodiments the representative objects could be other types of objects in the object store 110, such as groups 114 or applications 112, for example, and that users could express affinities for such objects rather than for (or in addition to) pages 111.

The social networking system 100 further comprises a sub-group module 125 that performs actions with respect to sub-groups of the users 111, such as forming sub-groups and forming descriptions of existing sub-groups. The sub-group module 125 is now described in more detail, below.

Figure 2:
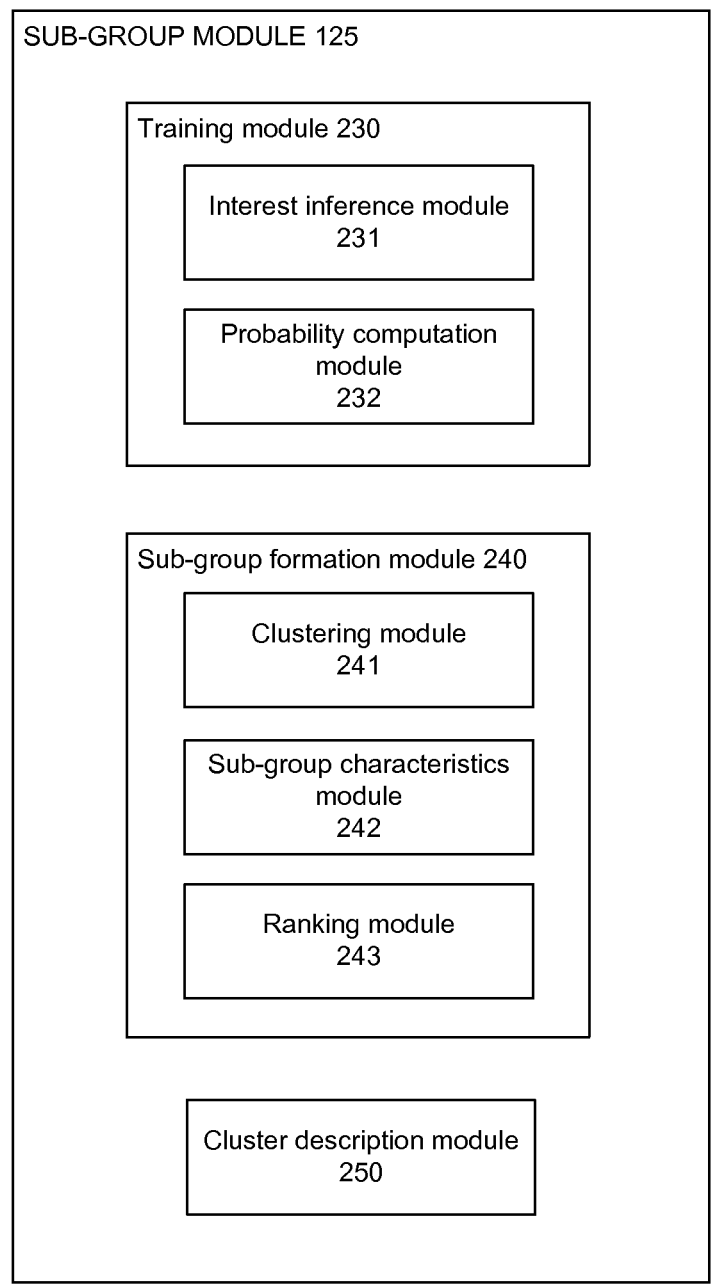
FIG. 2 is a block diagram illustrating the sub-group module of FIG. 1, according to one embodiment.

FIG. 2 is a block diagram illustrating the sub-group module 125 of FIG. 1. The sub-group module 125 comprises a sub-group formation module 240 that forms a plurality of sub-groups from an initial given group of users 111, a cluster description module 250 that forms descriptions of the sub-groups, and a training module 230 that performs initial data processing to produce information used by the sub-group formation module and the cluster description module. These modules are now described in greater detail.

The training module 230 performs initial data processing to produce information used by the subgroup formation module 240 in the cluster description module 250 to form and describe user sub-groups.

Specifically, the training module 230 comprises an interest inference module 231 that applies machine learning to map the user affinities vector 124 for a given user to a set of interests 123. Mapping the user affinities vector 124, which is expressed for the various topics 122, to the smaller set of interests 123 reduces the dimensionality of a vector used to describe user affinities or interests, which enhances the ability of the sub-group formation module 240 to form meaningful sub-groups. In one embodiment, the interest inference module 231 employs Collapsed Gibbs sampling for Latent Dirichlet Allocation (LDA).

Figure 3:
FIG. 3 illustrates a simplified conceptual example of the mapping from a greater number of topics to a lesser number of interests, according to one embodiment.
Figure 3:

FIG. 3 illustrates a simplified conceptual example of the mapping from a greater number of topics to a lesser number of interests, according to one embodiment. Specifically, the affinities vector 124 for a particular user u is shown expressed in terms of the topics 122, with the user having expressed affinities for the 513th, 1096th, 3566th, and 5124th topics out of a set of 6,000 possible topics. A mapping operation 305 converts the expressed affinities from the topic space to the (smaller) interest space, determining that the affinities for the expressed topics are equivalent to the 496th and 556th interests out of a set of 600 interests.

Referring again to FIG. 2, the training module 230 further comprises a probability computation module 232 that computes probabilities of affinities in terms of interests. For example, in one embodiment the probability computation module 232 computes $P(O_i|I_j)$—the probability that a user 111 with interest j would have an affinity for object i (e.g., would like the ith representative page 126)—and also computes $P(I_j|U)$—the probability that a particular user having the user characteristics U would have interest j. Since $\Sigma_j[P(O_i|I_j)*P(I_j|U)]=P(O_i|U)$, the ability to calculate both $P(O_i|I_j)$ and $P(I_j|U)$ provides the ability to calculate $P(O_i|U)$, as well. Thus, knowledge of user interests is used to estimate user affinities for objects corresponding to given topics.

Specifically, in this embodiment the probability computation module 232 computes $P(O_i|I_j)$ as follows. The interest inference module 231 is used, for every user of some training subset of the users 111, to map the affinities vector 124 of the user to a set of interests 123. For each interest in the set of interests 123, the probability computation module 232 generates a topic affinity histogram based on the affinities vector 124 for the users of the training subset having that interest within their mapped interests. Specifically, the probability computation module 232 identifies the users of the training subset having the interest within their mapped interests, and generates the topic affinity histogram by summing the topic affinity counts from the affinities vector 124 for those users. For example, for a training subset of 10,000 users, 552 of the users might have the 17th interest within their mapped interests. If, of those 552 users, 46 had expressed an affinity for the 12th topic, then the histogram corresponding to the 17th interest would contain the value 46 in the 12th entry. The probability computation module 232 further generates, for each interest in the set of interests 123, a probability distribution corresponding to the histogram for that interest. Continuing the previous example, if there were a total of 2,612 expressions of interest for one of the topics 122 by the users of the training subset that have the 17th interest within their mapped interests, then the probability $P(O_i|I_j)$ of an arbitrary user having an affinity for object $O_i$ corresponding to topic i, given that the user has interest j, is (46/2,612), or approximately 1.76%.

In one embodiment, the probability computation module 232 computes $P(I_j|U)$ using machine learning, where U represents user characteristics data describing the user, such as the interests 123 corresponding to the user's affinity vector 124, or user profile data of that user. In one embodiment, the probability computation module 232 employs Gibbs sampling.

In one embodiment, the probability computation module 232 computes one function $P(I_j|U)$ for each interest j. Thus, to determine the probability of a user with user characteristics U having the jth interest, a system would first choose the jth function corresponding to interest j, and would then evaluate that function using characteristics U as the argument. Similarly, in one embodiment the probability computation module 232 computes one function $P(O_i|I_j)$ for each object i. Thus, to determine the probability that a user having the jth interest would have an affinity for ith object, a system would first choose the ith function corresponding to object i, and would then evaluate that function using index j as the argument.

The sub-group formation module 240 forms sub-groups out of a given group of users 111. Specifically, the sub-group formation module 240 comprises a clustering module 241 that forms the clusters that define the various sub-groups. In one embodiment, the sub-group formation module 240 generates, for every user in the given original user group, an interest vector corresponding to the user's affinity vector 124 using the interest inference module 231. The interest vectors then represent the users of the given original user group for purposes of clustering. A clustering algorithm, such as k-means clustering, is then applied to the interest of vectors. The clustering algorithm uses a distance function to determine how similar any two given interest vectors are; the greater the degree of similarity (equivalently, the lesser the distance) between a given pair of interest vectors, the greater the likelihood that they will be grouped into the same sub-group cluster. In one embodiment, the distance function used to compute the similarity of two interest vectors is the vector dot product—that is, the sum of pairwise products—with greater values indicating greater degrees of similarity. (Note that since the interest vector is less sparse than the affinity vector 124, clustering based on the interest of vector produces higher-quality results than clustering based on the affinity vector 124.)

The sub-group formation module 240 further comprises a sub-group characteristics module 242 that determines, for each sub-group generated by the clustering module 241, characteristics that represent the sub-group as a whole. In one embodiment, the sub-group characteristics module 242 represents the sub-group using the sub-group centroid vector, rather than selecting any one representative user within the sub-group, the centroid vector acting as a synthetic composite user. In such an embodiment, the sub-group characteristics module 242 first computes the centroid vector. Centroid vector computation may be accomplished by averaging the interest vectors within a sub-group, i.e., for each of the interests in the interest vectors, summing the corresponding values for that interest in the different interest vectors, and dividing by the number of interest vectors in the sub-group. The sub-group characteristics module 242 further determines characteristics that represent the centroid vector. In one embodiment, the centroid vector itself—that is, the averaged interest vector—is itself used as the characteristics. In another embodiment, a weighted average of whatever user characteristics U—such as the user's interest vector, or the user's profile data—is used to describe a given user, is used to describe the composite user represented by the centroid vector. For example, for each interest vector in the sub-group, the degree of similarity (equivalently, distance) produced by the distance function when applied to the interest vector and the centroid vector is treated as a weight and applied to the user characteristics U corresponding to the interest vector. The weighted user characteristics are then averaged, which emphasizes the characteristics of the users that are most similar to the composite user represented by the centroid vector.

The sub-group formation module 240 further comprises a ranking module 243 that ranks representative objects 126 with respect to the sub-group characteristics generated by the sub-group characteristics module 242. (The objects that are ranked are those objects with respect to which the conditional probabilities were generated, such as the pages 115.) This ranking can then be used to determine the objects for which users in the sub-group would most likely have an affinity. Specifically, the ranking module applies the conditional probabilities generated by the probability computation module 232 in order to rank the objects. As previously described, since $\Sigma_j[P(O_i|I_j)*P(I_j|U)]=P(O_i|U)$, the ability to calculate both $P(O_i|I_j)$, and $P(I_j|U)$ provides the ability to calculate $P(O_i|U)$, as well. Thus, given the conditional probabilities $P(O_i|I_j)$ and $P(I_j|U)$, which involve the intermediate variable $I_j$ corresponding to user interest, the value $P(O_i|U)$ can be calculated by multiplying $P(O_i|I_j)$ and $P(I_j|U)$. The various objects $O_i$ are then ranked based on value $P(O_i|U)$.

The cluster description module 250 produces a description for each of the sub-groups formed by the sub-group formation module 240, using the object rankings produced by the ranking module 243. Specifically, the cluster description module 250 identifies some number of the highest-ranked representative objects 126 in each sub-group—such as a predetermined number, or a predetermined percentage of the number of users in the sub-group. The cluster description module 250 then obtains a description of each of the highest-ranking objects, e.g. by identifying the topic 122 corresponding to the representative objects. The cluster description module 250 then produces a description for the sub-group according to the descriptions of each of the highest-ranking representative objects. For example, in one embodiment, the cluster description module 250 concatenates the textual descriptions of each of the topics 122 to produce the sub-group description. For instance, if the highest-ranking representative objects 126 for a particular sub-group had corresponding topics 122 "TOYOTA PRIUS," "HYBRID CARS," "RENEWABLE ENERGY," and "PBS," the cluster description module 250 could concatenate or otherwise combine these phrases to form a description of the sub-group.

The description formed by the cluster description module 250 is of particular use to a human user, to whom such phrases often convey an intuitive sense of the nature of the users in the sub-group. This permits, for example, providing customized information to the users of the sub-group. For instance, a car manufacturer might have submitted an initial target user group to the sub-group module. Upon seeing the description "TOYOTA PRIUS," "RENEWABLE ENERGY," and "PBS," for one sub-group of its initial target group, the car manufacturer might conclude that the sub-group contained people interested in environmental causes, and accordingly could produce an advertisement emphasizing its hybrid car models and their environmental benefits. Such customized advertisements are likely to produce better results, such as higher click-through rates or conversions, than a general ad provided to the entire initial target group.

Figure 4:
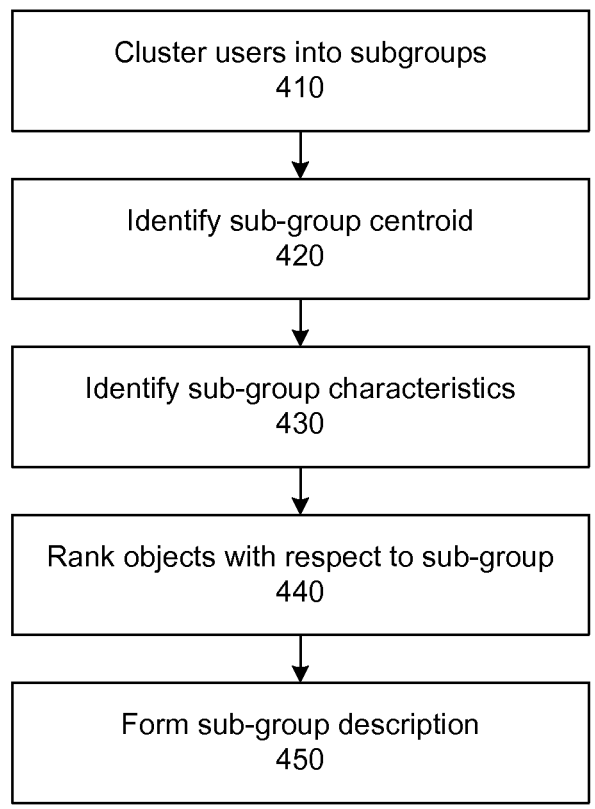
FIG. 4 is a flowchart illustrating the operations performed by the sub-group module when forming sub-groups from an initial target group of users and in forming descriptions of those sub-groups, according to one embodiment.

FIG. 4 is a flowchart illustrating the operations performed by the sub-group module 125 when forming sub-groups from an initial target group of users 111 and in forming descriptions of those sub-groups, according to one embodiment.

The sub-group module 125 first clusters 410 the initial target group of users into subgroups, as discussed above with respect to the clustering module 241. The sub-group module 125 further identifies 420 the centroid of each subgroup and identifies 430 the sub-group characteristics, forming the centroid vector and determining its corresponding composite user characteristics, as discussed above with respect to the sub-group characteristics module 242. The sub-group module 125 further ranks 440 representative objects 126, identifying a highest-ranking set of objects, as discussed above with respect to the ranking module 243. The subgroup module further forms 450 descriptions of each of the sub-groups using the highest-ranking objects, e.g., concatenating or otherwise combining the topics 122 associated with the highest-ranking objects, as discussed above with respect to the cluster description module 250.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   for each user of a group of users of a social networking system:
      generating an interest vector from a page affinity vector of the user, wherein:
         the page affinity vector of the user indicates, for each page of a plurality of pages of the social networking system, whether the user has expressly specified an affinity for the page,
         the interest vector indicates, for each concept of a plurality of concepts, whether the user is likely to have an interest in the concept, and
         the interest vector has fewer elements than the page affinity vector;
   clustering the group of users into a plurality of sub-groups by applying a distance function to the interest vectors of the users;
   for a first sub-group of the plurality of subgroups:
      identifying a centroid vector of the first sub-group based on the interest vectors of the users in the first sub-group;
      identifying user characteristics corresponding to the centroid vector;
      ranking each page of a plurality of pages on the social networking system with respect to the first sub-group based on the identified user characteristics, each page having an associated topic phrase;
      identifying a plurality of the highest-ranking pages;
      forming a textual description of the first sub-group comprising the topic phrases associated with the identified plurality of highest-ranking pages.

2. The computer-implemented method of claim 1, wherein identifying the centroid of the first subgroup comprises averaging the interest vectors of the users in the first sub-group.

3. The computer-implemented method of claim 2, wherein identifying the user characteristics corresponding to the user centroid comprises:
   for each user in the first sub-group:
      determining a distance of the user's interest vector from the centroid using the distance function;
      weighting user characteristics of the user based on the determined distance;
   setting the user characteristics corresponding to the user centroid to a weighted average of the weighted user characteristics of the users in the first sub-group.

4. The computer-implemented method of claim 1, wherein ranking each page of the plurality of pages with respect to the first sub-group comprises:
   computing first conditional probabilities that users would have an affinity for a particular page from the page affinity vector, given that the users have a particular interest from the interest vector;
   computing second conditional probabilities that users would have a particular interest from the interest vector, given that the users have particular user characteristics; and
   for each concept represented by the interest vector:
      computing, using the first conditional probabilities and second conditional probabilities, a conditional probability that a user having the concept in the user's interest vector will have an affinity for a given page.

5. The computer-implemented method of claim 4, further comprising ranking each page of the plurality of pages using the computed conditional probabilities.

6. The computer-implemented method of claim 1, wherein the interest vector is generated directly from the page affinity vector, without reference to prior values of the interest vector.

7. The computer-implemented method of claim 1, wherein identifying the user characteristics corresponding to the centroid comprises averaging characteristics of users in the sub-group.

8. A computer system comprising:
   a computer processor; and
   a non-transitory computer-readable storage medium storing instructions executable by the processor, the instructions comprising:
      instructions for, for each user of a group of users of a social networking system:
         generating an interest vector from a page affinity vector of the user, wherein:
            the page affinity vector of the user indicates, for each page of a plurality of pages of the social networking system, whether the user has expressly specified an affinity for the page,
            the interest vector indicates, for each concept of a plurality of concepts, whether the user is likely to have an interest in the concept, and
            the interest vector has fewer elements than the page affinity vector;
      instructions for clustering the group of users into a plurality of sub-groups by applying a distance function to the interest vectors of the users;
      instructions for, for a first sub-group of the plurality of sub-groups:
         identifying a centroid vector of the first sub-group based on the interest vectors of the users in the first sub-group;
         identifying user characteristics corresponding to the centroid vector;
         ranking each page of a plurality of pages on the social networking system with respect to the first sub-group based on the identified user characteristics, each page having an associated topic;
         identifying a plurality of the highest-ranking pages;
         forming a description of the first sub-group based on the topics associated with a plurality of the highest-ranking pages.

9. The computer system of claim 8, wherein identifying the user characteristics corresponding to the centroid vector comprises:
for each user in the first sub-group:
determining a distance of the user's interest vector from the centroid using the distance function;
weighting user characteristics of the user based on the determined distance;
setting the user characteristics corresponding to the user centroid to a weighted average of the weighted user characteristics of the users in the first sub-group.

10. The computer system of claim 8, wherein identifying the centroid of the first subgroup comprises averaging the interest vectors of the users in the first sub-group.

11. The computer system of claim 8, wherein ranking each page of the plurality of pages with respect to the first sub-group comprises:
for each concept represented by the interest vector:
computing a conditional probability that a user having the concept in the user's interest vector will have an affinity for a given page.

12. The computer system of claim 11, the instructions further comprising instructions for ranking each page of the plurality of pages using the computed conditional probabilities.

13. A non-transitory computer-readable storage medium storing instructions executable by a processor, the instructions comprising:
instructions for, for each user of a group of users of a social networking system:
generating an interest vector from a page affinity vector of the user, wherein:
the page affinity vector of the user indicates, for each page of a plurality of pages of the social networking system, whether the user has expressly specified an affinity for the page,
the interest vector indicates, for each concept of a plurality of concepts, whether the user is likely to have an interest in the concept, and
the interest vector has fewer elements than the page affinity vector;
instructions for clustering the group of users into a plurality of sub-groups by applying a distance function to the interest vectors of the users;
instructions for, for a first sub-group of the plurality of subgroups:
identifying a centroid vector of the first sub-group based on the interest vectors of the users in the first sub-group;
identifying characteristics corresponding to the first sub-group;
ranking each object of a plurality of objects with respect to the first sub-group based on the identified characteristics, each object having an associated topic;
forming a description of the first sub-group based on the topics associated with a plurality of highest-ranking objects of the ranked objects.

14. The non-transitory computer-readable storage medium of claim 13, wherein the objects are pages of the social networking system.

15. The non-transitory computer-readable storage medium of claim 13, wherein identifying characteristics corresponding to the sub-group comprises:
identifying user characteristics corresponding to the centroid vector by weighting characteristics of the users in the sub-group according to their distances from the centroid vector.

16. The non-transitory computer-readable storage medium of claim 15, wherein identifying the centroid vector of the first subgroup comprises averaging the interest vectors of the users in the first sub-group.

* * * * *